June 4, 1935.  A. J. SMITH  2,003,396
BODY TRIM STRUCTURE
Filed Nov. 15, 1930
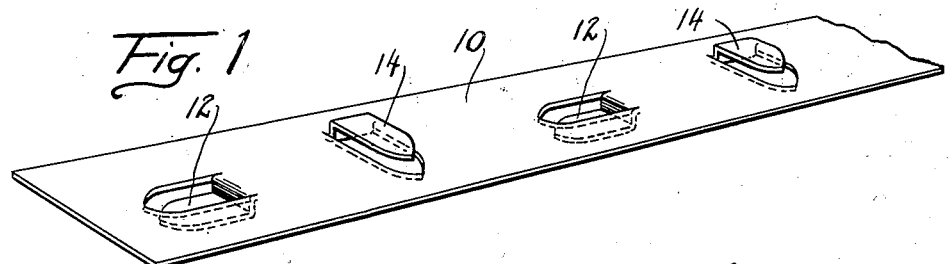
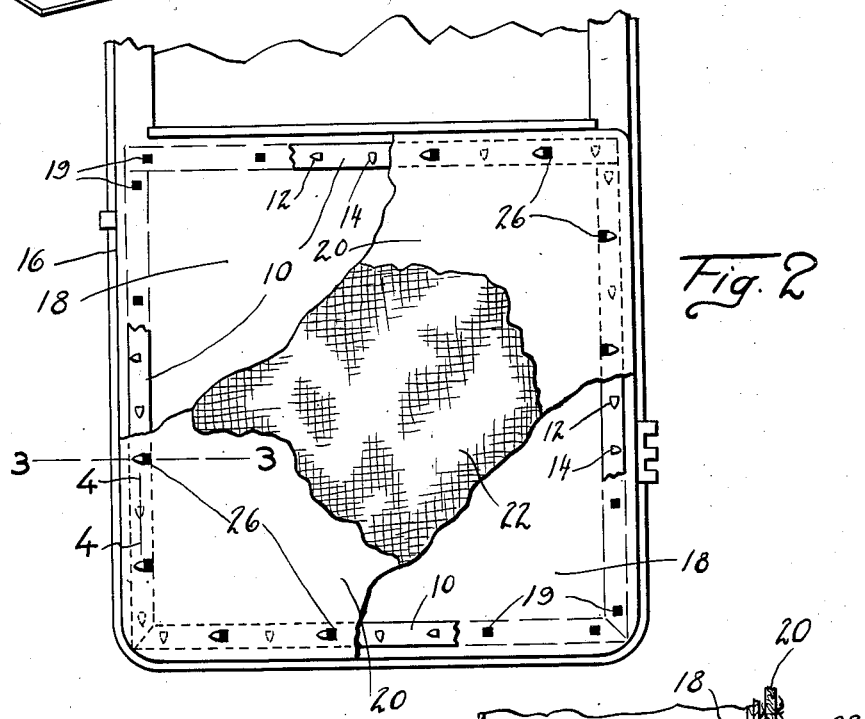
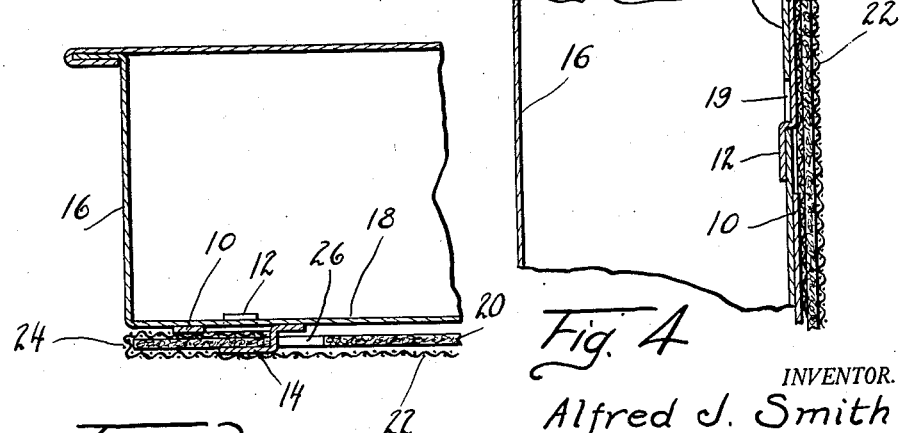
INVENTOR.
Alfred J. Smith
BY
Parker & Burton
ATTORNEYS Patented June 4, 1935

2,003,396

UNITED STATES PATENT OFFICE 2,003,396

BODY TRIM STRUCTURE

Alfred J. Smith, Detroit, Mich., assignor to Woodall Industries Incorporated, a corporation of Michigan Application November 15, 1930, Serial No. 495,940

4 Claims. (Cl. 45—138)

My invention relates to improvements in interior trim construction for automobiles and particularly to improved means for securing an interior trim panel to the body frame, such as a door panel to a door frame of an automobile body, but is applicable to the securing of panels of sheet material to supoprting frames generally and in such a manner that the securing means is concealed; and to an improved method of securing such a panel in place.

An object of my invention is to substantially reduce the time required for securing the cardboard panels, now generally used to provide the trim for the interior of automotive vehicle bodies, to the frame structure.

The panels used for the interior trim of vehicles are customarily covered with some sort of trim material prior to assembly. It is necessary to provide means whereby these covered panels may be rapidly and securely fastened to the supporting frame and the attaching means should be completely concealed.

One method heretofore used consisted in the provision of spaced apart openings, spaced inwardly from the margin of the panel so that they would not be covered by the trim material which was turned over the edges of the panel and adapted to align with apertures in the supporting frame.

Suitable individual removable fasteners extended through these aligned openings and secured the panel in place. The insertion of these fasteners in the apertures in the panel and the aligning and insertion into the openings in the frame involved considerable effort and time of the trimmer.

The prime desideratum of my invention is to eliminate to a large extent the time required to position the panel by providing an integral fastening element adapted to extend along the entire length of one edge of a panel and to be secured thereto as a unit and to be also secured to the frame as a unit. I propose to provide each extended integral fastening element with means whereby it may be secured, from the rear, along the edge of the panel by a single movement of the trim worker and subsequently positioned firmly in place upon the supporting frame of the automotive vehicle with a like movement.

With my improved fastening means it will simply be necessary to insert one of the individual strip fastening units along each edge of the trimmed panel, from the rear face thereof, each insertion requiring but one movement on the part of the trim man, and subsequently secure the entire panel in position with a single similar movement on the part of said worker. Obviously a great saving of time will result.

It is a further object of my invention to provide a simplified fastening unit, inexpensive to manufacture and easy to manipulate.

Various other objects and meritorious features of my invention, including ready and rapid removal or replacement of the panel, will be apparent from the following description taken in conjunction with the drawing wherein like numerals refer to like parts throughout the several figures, and wherein:

Fig. 1 is a perspective of my improved fastening unit,

Fig. 2 is an elevation, partly broken away for the sake of clearness, of a panel positioned by means of my unit, Fig. 3 is a section on 3—3 of Fig. 2, and Fig. 4 is a section on 4—4 of Fig. 2.

Referring to the drawing, numeral 10 indicates a relatively thin strip of sheet material, preferably of metal, having tabs 12 and 14 struck therefrom at spaced apart intervals along its length. It will be noted that alternate tabs 12 extend longitudinally along the length of the strip and that alternate tabs 14 extend transversely across the strip.

By utilizing strip material of an inherently springy material each of the tabs 12 and 14 will have a flexible, gripping tendency. I have illustrated my improved fastening means in conjunction with the door frame 16 of a conventional automotive vehicle body. The panel supporting portion 18 of door frame 16 is provided with apertures 19 at intervals around its periphery, these apertures being preferably square or rectangular, and spaced apart at intervals corresponding to the distance between alternate tabs 14, or 16.

Each panel is provided with suitable apertures 26, here shown as square or rectangular in shape, at spaced apart intervals around its margin. The panel is covered with trim material 22 which is turned over the edges of the panel as at 24 and securely fastened to the rear thereof. The apertures 26 are clear of the turned over portion 24 of the trim material and are spaced apart, as are the apertures 19 in the frame 18, at distances equal to the distance between alternate tabs 12 or 14 of the fastening strip 10.

To position a panel in place on a frame, a plurality of strips 10 are secured to the marginal portion of the rear face of the trimmed panel by inserting the transverse tabs 12 or 14 into the apertures 26 of the panel. Inasmuch as the tabs 12 and 14 are designed to align accurately with the apertures 26 each of these strips may be positioned properly in the panel by a single movement of the trim worker. The strips 10 which are designed to extend vertically, as are the two side strips in Fig. 2, utilize the transverse tabs 14 to secure the strip to the panel while the top and bottom horizontal strips utilize the longitudinally extending tabs 12 for inserting in the panel.

Having inserted the strips in position around the margins of the panel these strips will provide rearwardly and downwardly projecting rectangular tabs around the entire margin of the panel which are adapted to drop as a unit in the spaced apart apertures 19 provided in frame 18. The inherent springiness of the tabs functions to clasp the panel firmly in position against the frame.

As indicated in Fig. 4 longitudinally extending tabs 12 will be available for this purpose on the vertical side strips, while transversely extending tabs 14 will be in a position to drop into the frame apertures 26 in the horizontal top and bottom strips. Thus it will be apparent that the entire panel is properly positioned in place upon the frame simply by aligning the respective tabs 12 and 14 with the apertures 26 provided in the frame and then inserting the tabs in their respective apertures and finally dropping the whole panel as a unit.

The procedure outlined above constitutes a substantial improvement over any assembly hitherto known or utilized for trim panels on automotive body structure and eliminates the necessity of a fastener for each individual opening, the insertion and securing of which requires accuracy and considerable time. Each of the fastener strips 10 requires but a single movement of the trim worker for securing the same to the trimmed panel, and since the entire panel may be slipped into place with a single movement after the strips are secured to the margins of the panels, the assembly is relatively simple and rapid.

Having illustrated a preferred embodiment of my improved structure, various others will be apparent to those skilled in the art and for that reason I intend to limit myself only within the scope of the appended claims.

What I claim is:

1. A vehicle body interior comprising, in combination, a door frame having a plurality of spaced apart apertures around its margin, each aperture having a horizontal supporting edge, a panel having a plurality of strips secured to the rear thereof along its margin, and substantially L-shaped securing means integral with said strips projecting rearwardly and downwardly of said panel and seated upon the horizontal supporting edges of in said frame apertures.

2. In combination with a supporting frame having a plurality of spaced apart fastener receiving apertures and a panel covering the frame having a corresponding plurality of spaced apart fastener receiving apertures arranged along horizontal and vertical margins, a strip arranged along the horizontal margin of the panel between the panel and the frame having fastener parts receivable within the apertures of the panel and fastener parts on the opposite side extending downwardly and being receivable within the apertures in the frame, a second strip arranged similarly along the vertical margin having downwardly extending fastener parts receivable within the apertures in the frame and fastener parts receivable within the apertures in the panel.

3. In combination with a panel supporting frame having a plurality of apertures extending around margins thereof, a panel, strips secured to the margins of said panel, the side of each strip opposite to the panel being provided with saddle like projections each extending downwardly with reference to the supporting frame, said projections being adapted to pass through the apertures in the frame and seat upon the lower edges thereof upon subsequent downward movement of the panel.

4. In combination with a panel supporting frame having a plurality of alined apertures extending around the margins thereof, a panel provided with marginal apertures adapted to aline with the apertures in said frame in staggered relation thereto, and strips secured to the margins of said panel through the medium of the apertures therein, each of said strips including a series of hooks extending away from and thence downward and parallel to said strip on the side thereof opposite the panel and adapted to seat upon the edges of the apertures in the supporting frame to position said panel.

ALFRED J. SMITH.